Aug. 15, 1933.  T. M. KEKICH  1,922,301
METHOD OF TREATING LIQUID MATTE
Filed Aug. 26, 1929
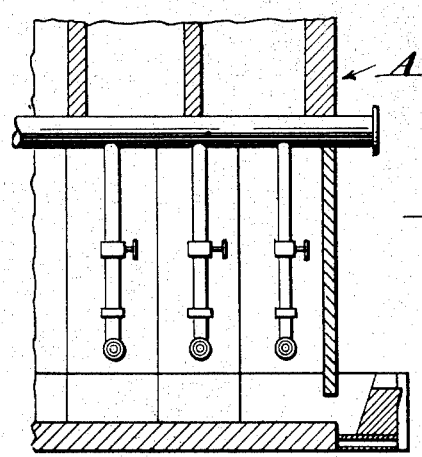
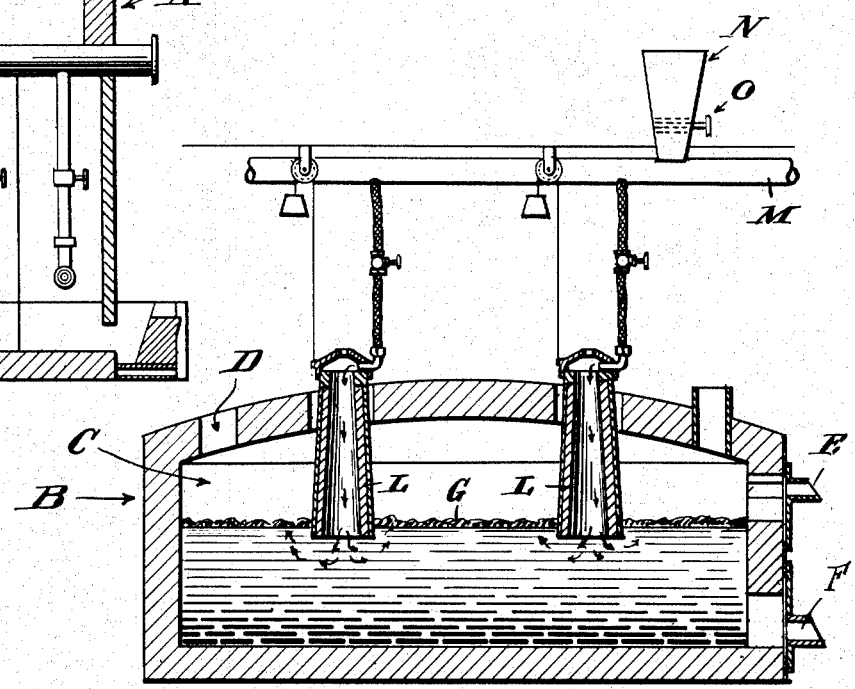
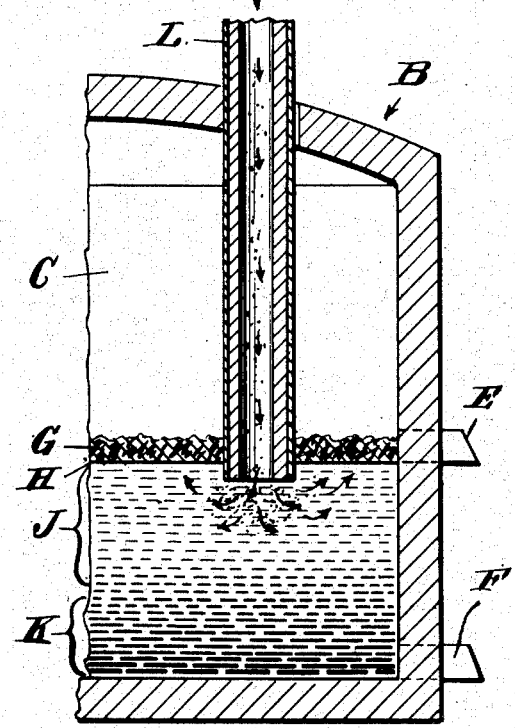
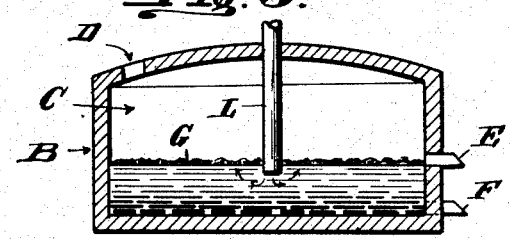
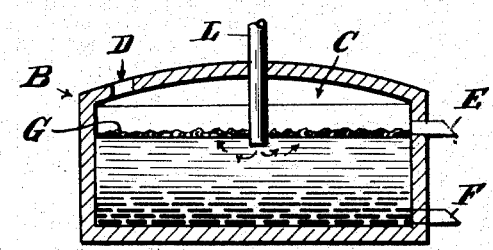
Inventor:
Thomas M. Kekich
By
Atty.

Patented Aug. 15, 1933                                                                                           1,922,301

UNITED STATES PATENT OFFICE 1,922,301

METHOD OF TREATING LIQUID MATTE

Thomas M. Kekich, Los Angeles, Calif.

Application August 26, 1929. Serial No. 388,404

4 Claims. (Cl. 75—62)

This invention relates to a method of smelting and particularly pertains to a method of treating liquid matte in the refining of sulphite ores such as copper and lead; the invention more especially relating to a method of effecting the removal of slag from melted sulphide ores by the introduction of air and comminuted materials into a mass of molten ore or liquid matte as set forth in my copending application for United States patent on a converting furnace filed December 31, 1927, Serial Number 243,960, which matured into Patent No. 1,774,486.

An object of my invention is to provide a method of treating melted sulphide ores whereby the formation and removal of slag may be effected in a single operation at a minimum of expense and in such manner as to obviate the use of apparatus costly to install, maintain and operate, thereby enabling the smelting of sulphide ores in localities remote from the usual smelting plants and rendering possible the economical reduction of sulphide ores, especially low grade sulphide ores, where it is now unprofitable to work the ore deposits because of the prohibitive costs incident to transportation of the raw ore to the smelters.

Another object is to provide a method of smelting in which the sulphide ore under treatment may be readily conditioned to facilitate separation of the metal and slag constituents, by the addition to the melted ore of reactive substances lacking in the raw ore under treatment and necessary to afford a proper mixture of the several ingredients essential to effect smelting such as silica, sulphur, iron oxide, lime, etc., and whereby air, together with a fuel, such as carbon or sulphur, may be introduced into the melted ore to maintain a fusion temperature in the mass during conversion thereof.

Another object is to provide a method of converting melted sulphide ores or liquid matte into metal and slag whereby concentrates and other fines may be smelted during the conversion action, thus doing away with reverberatory smelting as now commonly practiced in smelting ores too fine for treatment in the blast furnace.

Another object is to provide a process of converting matte whereby the cost of power is greatly reduced over present methods and whereby the sintering, roasting, converting and reverberatory departments now generally employed in smelting operations are dispensed with.

Another object is to provide a method of converting matte whereby a clean waste or slag is produced, which is not possible with present methods, thus effecting a maximum recovery of the metal.

Another object is to provide a method of treating matte whereby the introduction into the matte of reactive agents is accomplished in such fashion as to largely obviate the use of linings of reactive character in the converting apparatus employed thereby increasing the life of converters.

With the foregoing objects in view, together with such other objects and advantages as may subsequently appear, my invention resides in the features and steps hereinafter described and claimed; the method and a means for carrying it into effect being illustrated in the accompanying drawing in which:

Fig. 1 is a view in section of a converter furnace, and its associated blast furnace, as adapted to effectuate my method;

Fig. 2 is a diagrammatic view in section illustrating the manner of introducing air and comminuted solids into the liquid matte in the converter;

Figs. 3 and 4 are diagrams in section illustrating the manner of progression of the method.

The present method contemplates the initial melting of a sulphide ore to convert it into a liquid matte which is effected in the usual manner as by subjecting the ore to the action of a melting temperature in a blast furnace A. This melted ore or liquid matte, consisting of the usual metallic constituents of the ore such as copper, iron, lead, tin, gold, silver, arsenic, antimony, and etc., together with associated impurities, such as sulphur, silica and so forth, is delivered from the furnace into a receptacle B; the receptacle being of the character of a converting furnace having the usual bottom, side and top walls enclosing a chamber C. The top wall of the receptacle B is formed with an inlet opening D through which charges of melted ore or matte are delivered to the chamber C and the side wall of the receptacle is provided with the usual vertically adjustable draw-off spouts E and F; the spout E serving as a means for effecting discharge of slag and the spout F serving as a means for evacuating the metal in the manner common in converting furnace operations.

In carrying out my present method an initial charge of melted sulphide ore or liquid matte is delivered from the furnace A directly into the receptacle B; the charge being of suitable volume and filling the receptacle B to a desired level. This charge of melted ore or liquid matte consists of the usual metal and slag constituents, which on delivery of the charge to the receptacle B are caused to separate, at least in part, by the heavier metal content of the charge settling by gravity to the bottom of the melted mass and the lighter slags rising and floating on the surface of the matte. The slags initially formed in the furnace and delivered to the receptacle B being usually of a volume considerably in excess of the volume of the associated melted metal which will readily separate therefrom, a quantity of this produced slag is initially drawn from the receptacle B through the take-off spout E previously adjusted to the proper level, in the usual manner.

Additional charges of the melted ore or matte may be delivered to the receptacle B to increase the volume of the melted mass within the latter if desired; the excess formed slag being withdrawn from time to time.

The essence of the present invention resides in introducing streams of air together with either pulverulent solid reactive agents, or comminuted fuel, or both downwardly into the melted matte in the receptacle B at points beneath and proximate to the floating body of slag G apart therefrom and contiguous the surface H of the lighter portions J of the melted matte and remote from the heavier portions K of the melted metal located at the bottom of the melted mass; and in directing the incoming streams of air with the associated solid particles downwardly into the upper portion of the melted matte beneath the slag. This is effected as here shown by providing vertically adjustable tubes L, the lower end portions of which are passed through the body of slag G and are positioned with their terminals extending immediately below the surface H of the liquid matte that lies immediately below the floating body of slag. The upper ends of the tubes L are connected to a suitable controlled source of air supply under pressure through a conduit M, and, as a means for delivering granular solid materials into the air streams emitted through the tubes L, one or more feed hoppers N are arranged with their outlets leading into the conduit M through regulating valves O, through which hoppers the granular material is introduced into the air line in regulated quantities.

The air is delivered under pressure into the matte and accordingly is forced downwardly into the latter together with the associated solids as indicated by the arrows in Figs. 1 and 2, thus effecting delivery of the air and the solid particles into the lighter portions of the melted matte which comprise portions of the melted ore from which the slag is not readily separated from the metal in the initial melting of the ore whereby this portion of the charge is treated by the incoming air together with such granular particles as to bring about further separation of the slag and metal.

The air stream being directed downwardly into the melted matte penetrates the latter but a short distance and such of the air as is not consumed in the downward travel is directed upwardly through the upper and lighter portion of the matte thus effecting a thorough action thereon; the down stream coupled with the upstream causing such agitation of the lighter body of the mass as to insure thorough intermixture with this portion of the mass of the air and its associated materials. The volume of air thus introduced into the matte, is sufficient to Bessermerize or convert the matte and accordingly is also sufficient to agitate the upper part of the bath to maintain regulated combustion within the bath in order to keep the bath in a sufficiently fluid state.

The solid particles introduced into the melted matte together with the stream of air vary in character according to the nature of the melted matte under treatment; it being contemplated to supply to the matte the substances normally lacking in the ore and necessary to effect proper smelting thereof. For example, in the treatment of melted sulphide ores in which there is an insufficiently or proper proportion of silicates in order to effect the desired combination of silica and iron oxide a comminuted silicious material such as gold ore rich in silica is directed into the melted matte with the air, whereby the silica is utilized and the gold added to the metal content of the matte.

Where the ore contains an excess of silicious material iron oxide is delivered with the air to the melted matte, and where the ore contains insufficient sulphur or carbon these materials are added with the stream of air thus supplying fuel which in the presence of the air and the high temperatures of the melted matte will combust thereby developing further heat necessary to effect melting and separation of metals from the matte. In like manner concentrates or fines containing minute metal particles may be introduced into the melted mass to effect recovery of such metal thus enabling the smelt- of such fines and concentrates together with the melted ore which can not ordinarily be accomplished by means of a blast furnace, such concentrates and fines being ordinarily treated in reverberatory furnaces. By this method of introducing fine particles into the melted matte flue dust or other fine refuse containing valuable metal particles may be delivered to the melted matte, which in the case of flue dust containing a large proportion of carbon such dust will be used to supply additional fuel to the matte under treatment.

In this manner additional metal is added to the melted matte under treatment and will accumulate in the receptacle B thereby raising the level of the melted metal and of the matte in the receptacle. As this occurs the tubes K are elevated from time to time to maintain their lower ends in their proper projected position beneath the surface of the liquid matte and above the body of separated melted metal as illustrated in Figs. 3 and 4 in which Fig. 3 shows an initial charge and Fig. 4 illustrates the charge as increased by the addition of metals through the tubes L. It being essential to maintain the lower ends of the tubes within the zone immediately underlying the slag and above the body of separated metal, the tubes are either raised or lowered from time to time as occasion may require; being raised as the level of the mass rises, as above stated, and being lowered when the level is lowered as when drawing off the separated metal.

The invention is especially applicable for use in the treatment of melted copper matte and is particularly valuable in the treatment of low grade copper ore, it rendering possible the treatment of matte to effect separation of the metals and slags by the introduction into the melted matte of sufficient air to effect combustion of the fuel constituents thereof and add fuel thereto where required as well as to add reactive agents such as silica to effect Bessemerizing or converting thereof as above set forth.

The method is also applicable for use in the treatment of lead matte to effect separation of the constituents thereof.

Such matte carries iron and sulphide lead and being a sulphide ore is subject to being treated to effect conversion and Bessemerization thereof by the method previously set forth whereby such air as is needed to maintain combustion is supplied to the matte together with silica or other flux material for forming the slag, as well as the addition of carbon or other fuel where additional fuel is required.

In the treatment of the sulphide ore to effect conversion thereof by the method herein set forth any desired material ordinarily employed in converting, Bessemerizing and smelting operations may be added to the bath with the incoming air stream as occasion may require. The silica and carbon employed may be of any suitable character, but where gold or other metallic ores are available which contain the required silica and carbon, such ore in a comminuted form may be fed to the matte with the air stream thereby not only supplying the silica and carbon but adding to the recoverable metal of the matte under treatment.

By directing the stream of air downwardly into the melted matte as specified, only that portion of the matte is acted upon as is necessary and agitation of the settled heavier portions of the metal is avoided which is important in that it obviates the readmixture of the previously separated metals with the body of matte superimposed thereon and thereby insures the formation of a clean slag and enables the recovery of substantially all of the metal content of the matte.

The required temperatures in the melted mass are readily maintained by controlling the supply of air and fuel through the tubes L and in like manner the proper proportions of the reactive agents supplied to the matte is controlled.

It will now be seen that by means of my process any suitable or necessary substances may be readily incorporated into a sulphide matte to effect separation of impurities and the resultant recovery of the metal.

After treating the matte until the desired separation or conversion has taken place, the slag is removed and the metal is drained off in the usual manner; and as required.

I claim:

1. The method of treating liquid matte, consisting in confining the matte in such manner as to separate the metal content thereof by gravity from the slag content and form a mass of liquid metals at the bottom of the mass and lighter constituents at the top of the mass and also form a body of slag floating on the surface of the lighter portion of the mass, and introducing downwardly into the lighter portion of the mass and at a point below the body of slag and above the liquid metals, a stream of air together with comminuted solids containing silica together with a granular combustible material having metallic constituents.

2. The method of treating molten matte, consisting in introducing into molten matte from and at a point beneath the slag zone of the molten matte, a stream composed of air, a finely divided fuel, metallic particles, and silicious material.

3. The method of treating molten matte, which consists in introducing into molten matte from and at a point beneath the slag zone and above the molten metal zone of said molten matte, a stream composed of air, a fuel, metallic substances, and silicious material.

4. The method of treating molten matte, which consists in introducing in a downward direction into molten matte from a point beneath the slag zone and without penetrating the molten metal zone of the molten matte, air, a combustible substance having metallic constituents, and silicious material.

THOMAS M. KEKICH.